United States Patent [19]

Batton

[11] 4,164,822
[45] Aug. 21, 1979

[54] PORTABLE MAP READING SYSTEM

[76] Inventor: James L. Batton, 7101 Dunshire Way, Apt. 4C, Baltimore, Md. 21222

[21] Appl. No.: 866,860

[22] Filed: Jan. 4, 1978

[51] Int. Cl.² ............................................. G02B 27/02
[52] U.S. Cl. ........................................ 40/361; 40/902
[58] Field of Search ...................... 40/152.2, 361, 362, 40/363–367, 902–106.1; 235/441; 362/97; 339/17 CF

[56] References Cited

U.S. PATENT DOCUMENTS

| | | | |
|---|---|---|---|
| 1,989,803 | 2/1935 | Hoben | 40/361 |
| 1,997,157 | 4/1935 | Tauchek | 235/441 |
| 2,567,561 | 9/1951 | Hoffmann | 362/223 |
| 3,663,921 | 5/1972 | Richard | 339/17 CF |

Primary Examiner—Louis G. Mancene
Assistant Examiner—Wenceslao J. Contreras
Attorney, Agent, or Firm—John F. McClellan

[57] ABSTRACT

A portable map-display system for auto, boat and airplane uses and the like includes a plurality of translucent maps and a compact light box proportioned for backlighting one map at a time. To prevent unshielded glare from the light-box and to assure proper orientation of maps on the light-box a series circuit arrangement turns off the light circuit in the box when a map is not properly in place over the light-box. The series circuit arrangement includes a conductive strip asymmetrically disposed on each map and a pair of electrodes on the light-box adapted for resiliently receiving the conductive strip of a map between them to close the circuit and turn on the light.

14 Claims, 10 Drawing Figures

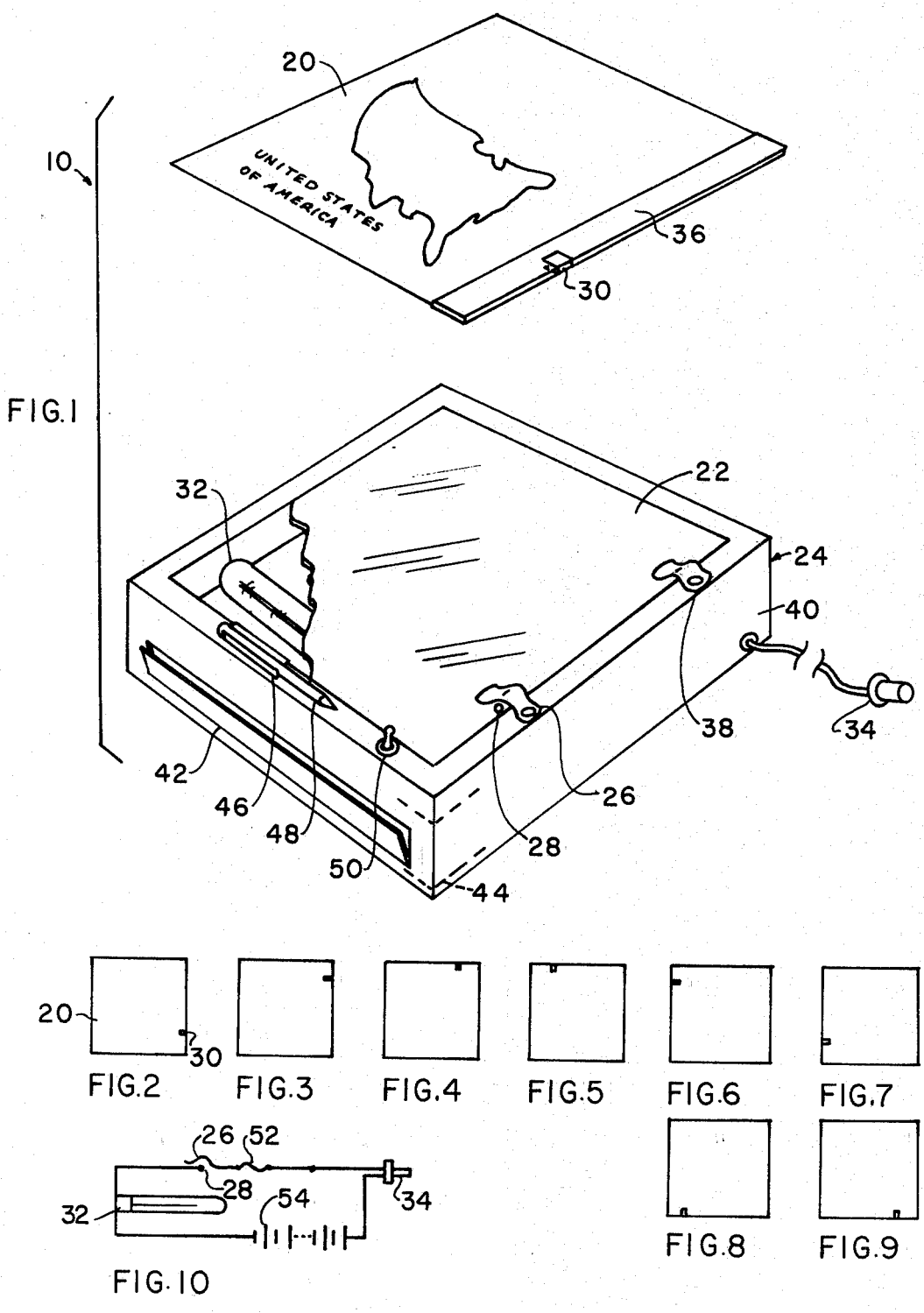

PORTABLE MAP READING SYSTEM

This invention relates generally to navigation equipment and particularly to map displaying apparatus.

A particular problem in map handling and reading occurs in the limited confines of vehicles such as automobiles, airplanes and boats. In bad weather conditions particularly, when natural illumination is poor or non-existent, it is important to preserve night vision, but night vision is impaired by the use of unshielded flashlights which often must be flashed about over large and unwieldy maps. In any event the ordinary use of big, folded maps is uncertain and time consuming, and in some conditions (such as in high winds) is nearly impossible.

Rolls of maps in frames can be backlighted but these are relatively slow because they often require cranking through unwanted areas to reach wanted areas, and are cumbersome and complex in contrast with provisions according to objects of the present invention. Other devices dealing with viewing of transparencies which are known include the following U.S. Pat. Nos.

3,094,781 to W. Vangor, 6-25-63, typifying many map devices for travel which employ transparencies;

3,190,174 to P. M. Field, 6-22-65 and also a division of this, 3,241,258, 3-22-66, disclosing a viewer for transparencies in which metal tab structure on individual slide mounts magnetically actuates an illuminating circuit.

3,438,702 to H. A. Milhaupt, 4-15-69, typifying many patents disclosing the use of gauge tabs to locate transparencies of various types.

Principal objects of the present invention are to provide a simple, compact, self-illuminating map display system which uses individual maps, which automatically assures correct orientation of maps before illuminating them, which can quickly be changed from displaying any map to any other map in a supply of maps conveniently stored, which is safe, simple and durably self protective in use and versatile in operation, which is attractive in appearance and which is economical to manufacture and to own.

In brief summary given for purposes of cursive description only and not as limitation, the invention includes a light-box having asymmetrically disposed light circuit actuator operable by a conductive element proportioned and positioned for the purpose in asymmetrical disposition on a translucent map which is sized to cover the illuminatable portion of the light box.

The above and other objects and advantages of the invention will appear more clearly on examination of the following description, including the drawings in which like reference numerals refer to like parts.

FIG. 1 is a perspective view showing the relation of parts of the invention in use, and partly broken away;

FIGS. 2 through 9 show the various orientations of a map in which the light box will and will not actuate:

FIG. 10 is a circuit diagram.

FIG. 1 shows the invention 10 with parts in relation just prior to use, correctly oriented translucent map structure 20 being ready for positioning on the corresponding, rectangular translucent top 22 of light box 24. According to this invention, illumination of the map by the light box is caused by contact of means on the map structure with a portion of the lightbox as follows. Sliding the map structure beneath the spaced clip structure on the light box shorts-out or connects electrodes 26 and 28 by means of conductive strip 30, which bears the same symmetrical relation to the map structure as the electrodes have to the translucent top, and which is preferably a slightly protrusive "U" shaped tab, crimped on the margin of the map. It will be appreciated that crimping attachment or the like permits location wherever desired and is adaptable to all map styles and sizes.

Convenient power for lighting the lamp assembly 32 inside the light box structure is obtained through wired plug 34 which detachably connects with conventional cigarette lighter sockets normally found in vehicles, placing the electrodes in the vehicle battery circuit. It will be evident that the economy and reliability obtained by this structure is made possible in part by the offset of the upper, large, arcuate-spring-clip electrode relative to the smaller, inner electrode which it shields, preferably preventing direct shorting of the two together by accidental pressure. The upper or outer electrode outer surfaces may be insulated and it may be arranged in the circuit as part of the ground normally formed by the vehicle frame. Connection of the upper electrode may be by a rivet as indicated and the lower electrode may be itself simply the head of a rivet passing through the translucent plastic top of the light box, both structures of extreme low cost, simplicity and reliability, permitting free but secure passage of the associated map structure.

The map structure margin at the strip may have reinforcement 36 of cardboard or the like for more secure holding of the strip and handling generally, if desired, and at least one extra spring clip is supplied to engage it, but not to function as part of the electrical system. The second arcuate spring clip 38 gives an attractive appearance by balancing the asymmetry, while also aligning the map structure.

The light box is rectangular and preferably plastic frame 40 holds the translucent top. Integral plastic-hinge door 42 on the side gives access to a storage space 44 holding a supply of the rectangular translucent flexible plastic plates substantially comprising the maps. The maps preferably are color-coded in sets covering specific areas such as region, state, city, or origin to destination such as New York to Washington, showing major routes. It is contemplated that a map set covering the area in which the system is sold will be supplied with the purchase, maps for other areas being purchasable as needed from service stations, auto clubs, drugstores, and the like.

Other features shown in FIG. 1 include on a margin of the frame where it is, it will be evident, also useful as map structure locator, a clip 46 for grease pencils 48 usable in laying out routes. An on-off toggle-switch 50 may be placed in series with the electrode circuit as a back-up switch, if desired.

FIGS. 2 through 9 show the various possible orientations of any map. Relative to the proper orientation of FIG. 2 it will be seen that there are seven aligned but improper orientations for the map structure in all of which the invention guards against mis-interpretation of maps by preventing illumination until proper orientation.

Proper orientation of a map is easily made according to a preferred aspect of the invention, the slightly protrusive strip 30 giving tactile indication under all conditions of map structure orientation; the cardboard or other thickening marginal reinforcement of the map structure rectangle also helping to maintain orderly presentation and storage.

FIG. 10 diagrams the extremely simple circuit for the unit, comprising cigarette-lighter adapter plug 34, conventional fuse 52 if desired, upper electrode 26 shielding the lower electrode 28, typical lamp 32 representing the many types and arrangements possible, and vehicle battery 54. As an alternative, a separate battery may be used.

Other advantages will be apparent from the foregoing such as the size-adaptability of the unit. Compactness fits it for underseat storage in vehicles and for easy carriage. It is evident that the strip which is preferably of malleable metal can be removed, relocated and replaced by ordinary plier crimping if desired, for training purposes or to present a particular edge of the map structure at a particular edge of the light box for reading to suit individual needs of reading and of access to the storage.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent:

1. In a portable map display system having map structure, a light box with translucent panel and light source for illuminating the map structure, and, associated with the map structure, means for actuating the light source, the improvement comprising: the means for actuating including first and second electrodes in spaced locations on the light box proximate the translucent panel and a conductive strip on the map structure located in position for electrically connecting the first and second electrodes when the map structure is in viewing coincidence with the translucent table, and means for preventing mis-orientation of the map structure on the light box comprising: said first and second electrodes having asymmetrical location on the lightbox relative to the translucent panel, said map structure having a shape substantially corresponding to the translucent panel and the conductive strip having asymmetrical location on the map structure corresponding to the location of the electrodes relative to the translucent panel.

2. In a system as recited in claim 1, means for tactile indication of map structure orientation.

3. In a system as recited in claim 2, the means for tactile indication including projection of the conductive strip.

4. In a system as recited in claim 3, the means for tactile indication including reinforcing margin structure proximate the strip.

5. In a system as recited in claim 4, the light box having means for holding map structure therein, including a door in an edge portion of the light box.

6. In a system as recited in claim 5, the light box having unitary, molded plastic structure including the door having plastic hinge structure.

7. In a system as recited in claim 6, the first electrode in the form of a resilient clip larger than and overhanging and shielding the second electrode.

8. In a system as recited in claim 7, all said electrodes having means for preventing direct contact therebetween including the first electrode having location offset from the second electrode.

9. In a system as recited in claim 8, the first electrode being arcuate in shape and the second electrode being in the form of a rivet head.

10. In a system as recited in claim 9, the means for actuating the light source further including in combination a plug proportioned for engaging a vehicular cigarette lighter outlet, and having connection with all said electrodes and light source.

11. In a system as recited in claim 8, structure proximate said electrodes on the light box for aiding in aligning said map structure.

12. In a system as recited in claim 11, said structure aiding aligning including a map clip in spaced relation with all said electrodes.

13. In a system as recited in claim 12, said structure aiding in aligning including a pencil clip, and a grease pencil for marking maps holdable in said clip.

14. In a system as recited in claim 8, the map structure including plural-area-related map structure.

* * * * *